(12) United States Patent
Meidar

(10) Patent No.: US 8,073,298 B2
(45) Date of Patent: Dec. 6, 2011

(54) PROCESS FOR FABRICATING A COMPOSITE UNDERBODY PANEL

(75) Inventor: Moshe I. Meidar, New York, NY (US)

(73) Assignee: Mag IAS, LLC, Sterling Heights, MI (US)

( * ) Notice: Subject to any disclaimer, the term of this patent is extended or adjusted under 35 U.S.C. 154(b) by 0 days.

(21) Appl. No.: 12/598,343

(22) PCT Filed: May 2, 2008

(86) PCT No.: PCT/US2008/062412
§ 371 (c)(1),
(2), (4) Date: Apr. 9, 2010

(87) PCT Pub. No.: WO2008/137671
PCT Pub. Date: Nov. 13, 2008

(65) Prior Publication Data
US 2010/0195959 A1 Aug. 5, 2010

Related U.S. Application Data

(60) Provisional application No. 60/915,521, filed on May 2, 2007.

(51) Int. Cl.
*G02B 6/44* (2006.01)
(52) U.S. Cl. .................. 385/101; 385/114; 385/147
(58) Field of Classification Search .......... 385/100–114, 385/147
See application file for complete search history.

(56) References Cited

U.S. PATENT DOCUMENTS

| | | | |
|---|---|---|---|
| 4,468,089 A * | 8/1984 | Brorein | 385/114 |
| 4,824,164 A | 4/1989 | Nakayama et al. | |
| 5,502,287 A * | 3/1996 | Nguyen | 174/113 R |
| 5,668,912 A * | 9/1997 | Keller | 385/100 |
| 6,247,747 B1 | 6/2001 | Kawanomoto et al. | |
| 6,438,301 B1* | 8/2002 | Johnson et al. | 385/101 |
| 6,822,168 B2* | 11/2004 | Klesing et al. | 174/254 |
| 2010/0127802 A1 | 5/2010 | Olson et al. | |

FOREIGN PATENT DOCUMENTS

CN      1166159 A      11/1997

OTHER PUBLICATIONS

Notification and Text Portion of First Office Action in corresponding Chinese case; CN200880020257.6, Date of Notification Mar. 22, 2011, 8 pages.

*Primary Examiner* — Daniel Petkovsek
(74) *Attorney, Agent, or Firm* — Reising Ethington P.C.

(57) ABSTRACT

A process for fabricating a fiber composite underbody panel for a vehicle begins by laying-up a first fiber composite sheet on a suitable form or tool. Current carrying wiring that is normally carried by the floor is laid in place on the first sheet, with the ends of the wires extending beyond the edges of the sheet. The wires are shielded to prevent the radiation of fields therefrom into the interior of the vehicle. Fiber optic cable is used to carry signals. A second fiber composite sheet is then laid-up on the first sheet. The two sheets with the embedded wires are placed in a heated mold to form the sheets into the desired finished shape and configuration. The ends of the copper wires and the fiber optic cables are then terminated by connectors so that they may be later coupled to the circuitry of the vehicle.

15 Claims, 2 Drawing Sheets

PROCESS FOR FABRICATING A COMPOSITE UNDERBODY PANEL

CROSS-REFERENCE TO RELATED APPLICATION

This application claims the benefit of U.S. Provisional Application Ser. No. 60/915,521 filed May 2, 2007 and is a 371 filing under 35 USC 365(c) of PCT/US08/62412 filed May 2, 2008.

The content of the above application is incorporated herein by reference in its entirety.

FIELD OF THE INVENTION

The invention relates to a process for fabricating a transportation vehicle underbody panel and the underbody panel that is produced thereby that reduces the electromagnetic fields that are radiated into the vehicle's interior.

BACKGROUND OF THE INVENTION

Present day underbody panels for transportation vehicles such as trains, busses, trucks and automobiles comprise a stamped metal panel. Such panels include the vehicle undercarriage, interior door panels, tailgates, and the like. Wires that are used in the vehicle are laid out along the panel with connectors at either end. The wires are held in place on the panel by clips, or by other layers that are added to the panel construction in the finished vehicle. Voltage and current carried by the wires in the finished vehicle create fields that radiate from the wires into the interior of the vehicle. As the control and communication systems in vehicles become more complex, more wires are required, more signals are carried, and the fields that are generated are increasing in strength. The increased EMF that is radiated into a transportation vehicle interior is a health hazard for the vehicle occupants.

It would accordingly be desirable to develop a transportation vehicle underbody panel that integrates the required wiring into the panel structure, and uses wiring that reduces the EMF that is radiated into the vehicle's interior.

BRIEF SUMMARY OF THE INVENTION

In accordance with the teachings of the invention, a first fiber composite sheet is laid-up on a suitable form or tool. Wiring that is normally carried by the floor is laid in place on the first sheet by means of a robot, template or other controlled device that sets the position of the wiring on the first sheet. Copper wires are used to carry high levels of current such as in electric or hybrid vehicles and are shielded to prevent the radiation of fields therefrom. Fiber optic cables are used to carry low levels of current for electrical communication signals. A second fiber composite sheet is then laid-up on the first sheet. The two sheets with the embedded wires are placed in a mold to form the sheets into the desired finished shape and configuration. Additional sheets or layers of material may be included to achieve desired levels of surface quality, structural stability, and acoustic damping. The formed sheets are placed in an oven to be cured if the resin used in the sheets is thermoset; or if the resin used is thermoplastic, the parts harden and are further processed for final finishing of the part.

DETAILED DESCRIPTION OF THE INVENTION

Figure 1:
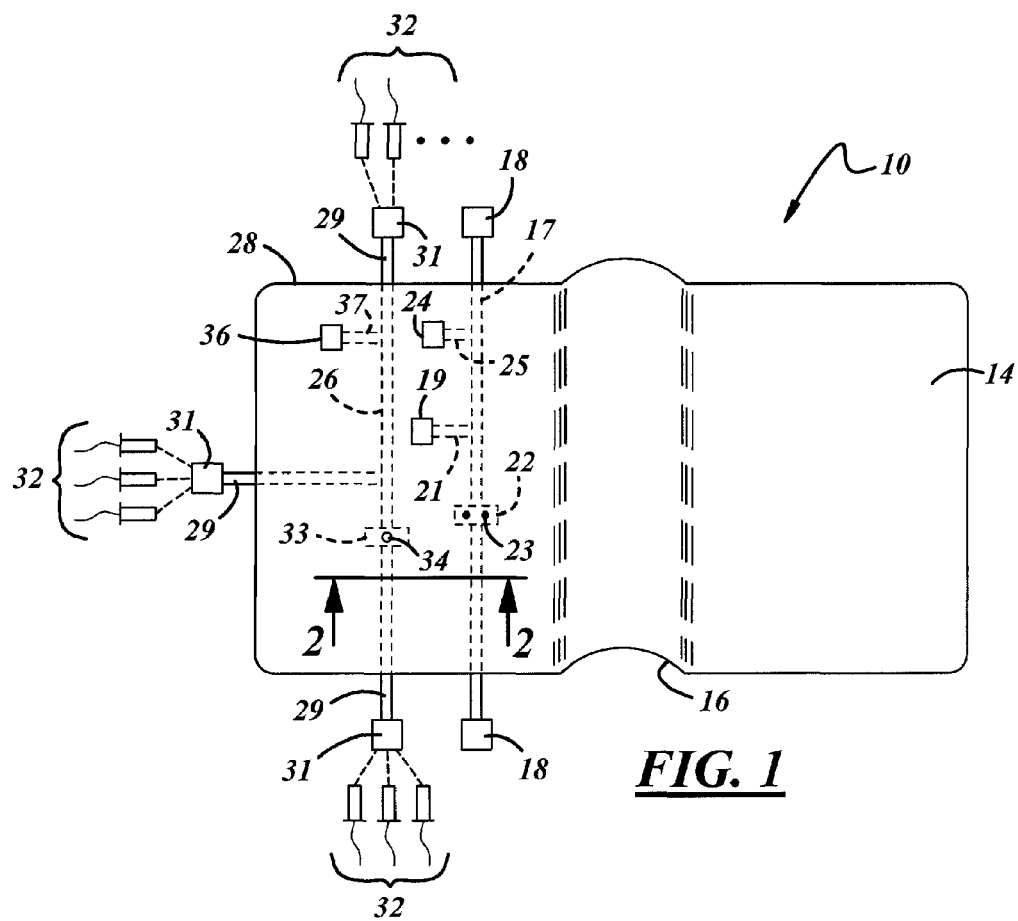
FIG. 1 is a top view of an underbody panel fabricated according to the invention.

Turning now to the drawing figures, FIG. 1 is a top view of an underbody panel 10 of a transportation vehicle fabricated according to the invention. In the embodiment shown, the underbody panel 10 is an undercarriage. The disclosed method may also be used to fabricate an inner door panel, a tailgate, or other similar transportation vehicle panels. The panel 10 comprises one or more fiber composite sheets 14 that are molded to have one or more features such as a raised tunnel portion 16. The term fiber composite sheet as used herein refers to a sheet formed from a cured resin binder having a high strength fiber or tape material dispersed uniformly throughout. The resin binder may be either thermoplastic or thermoformed as well known in the art. The fiber composite sheets 14 are laid-up on a form or tool (not shown) using fiber tow or fiber composite tape. Fiber tow has the advantage of being able to be used to form a part that exhibits complex curvature or a high number of discontinuities. Fiber tape has the advantage of being able to be applied to a surface at a higher rate than fiber tow, but the use of fiber tape is limited to parts that are relatively flat and continuous. Various fiber tow and tape laying machines are well known in the art.

A first set of wiring such as a power cable 17 is embedded in the fiber composite sheets 14. The ends of the power cable 17 extend beyond the edges or perimeter of the fiber composite sheets 14 and are terminated at either end by connectors 18 for coupling to other power circuitry in the transportation vehicle.

Connectors 19, 22 and 24 are also provided along the length of the power cable 17 between the ends. The connector 19 is connected to a branch line 21 that is coupled to the main power cable 17 and extends above the surface of the fiber composite sheets 14. The connector 22 is embedded in the fiber composite sheets 14 with only the receptacle portion 23 of the connector accessible from the surface of the sheet 14. The connector 24 uses insulation displacement contacts (IDC) that are provided with prongs that pierce through the composite sheets 14 and any insulation surrounding the cable 17 to make electrical contact with the conductors within the cable 17. As a result, the IDC connector 24 may be located at any position on the sheet 14 where it is in alignment with the cable 17 that is imbedded in the sheets. The IDC connector 24 may be connected to a branch line 25 containing either one or a single pair of conductors so that the contacts of the IDC connector will be coupled to the desired circuits that are carried in the cable 17.

A second set of wiring such as a data bus 26 is also embedded in the fiber sheets 14. The data bus 26 comprises one or more fiber optic cables 27 (best seen in FIG. 2) that extend beyond the edges or perimeter 28 of the fiber composite sheets 14. If the temperature used to process the fiber composite sheets is high, the use of glass fiber optic cable is preferred over plastic fiber optic cable because of the ability of the glass fiber to withstand the high processing temperatures. The ends 29 of the data bus 26 are terminated with suitable connectors 31. The connectors 31 will be used to connect the data bus 26 to a plurality of fiber optic cables 32 that are coupled to signal producers or receivers used throughout the vehicle in which the underbody panel will be installed.

Connectors may also be provided along the middle section of the data bus 26 to provide connection ability to the data bus other than at the ends. The connector 33 is coupled directly to the main portion of the data bus 26 with only the receptacle portion 34 of the connector accessible from the surface of the sheets 14. Connector 36 is coupled to a branch portion 37 of the data bus that extends above the surface of the fiber composite sheets 14.

Figure 2:
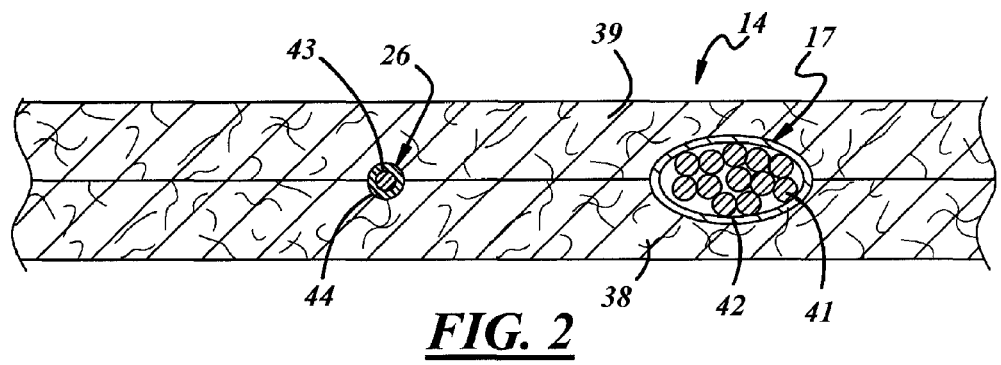
FIG. 2 is a sectional view of a portion of fiber composite underbody panel.

FIG. 2 is a sectional view of a portion of the fiber composite sheets 14 showing a first fiber composite layer 38 and a second fiber composite layer 39 that is formed on top of the first fiber composite layer 38. The power cable 17 is embedded between the two fiber composite layers 38 and 39. The power cable 17 comprises a plurality or bundle of copper wires 41 that are encased in a sheath 42. The sheath 42 may comprise a metal foil wrap or a metal tube that surrounds all of the wires 41 embedded in the fiber composite layers. The sheath will prevent the radiation of EMF that is generated as a result of current carried by the wires 41 from entering the transportation vehicle. Such fields have been determined to be a health hazard for those who are subjected to them.

The fiber optic data bus 26 is also embedded between the fiber composite sheets 38 and 39. The fiber optic data bus 26 may comprise a single glass optic fiber 43 that is surrounded by a protective sheath 44. Because the fiber optic data bus 26 carries signals in the form of light pulses rather than electrical current, electromagnetic fields are not radiated by the fiber optic cable, and a metallic sheath is not required.

In one embodiment, present day technology fiber optic communication cable is used, and as a result, as few as one or two fibers 43 may be sufficient to carry all of the communication channels required in a modern transportation vehicle. The connectors 31 on the ends 29 of the optic fibers 43 may coupled to distributed communication blocks 32 that connect to the front, rear, and side devices in the transportation vehicle, thereby eliminating the need to run individual wires back and forth through the vehicle to a single computer management module from every device. Thus, the use of the fiber optic network reduces the number of copper wires required to couple the signal devices together, with a consequent reduction in the EMF that is normally generated by the currents that are carried by such wires.

Figure 3:
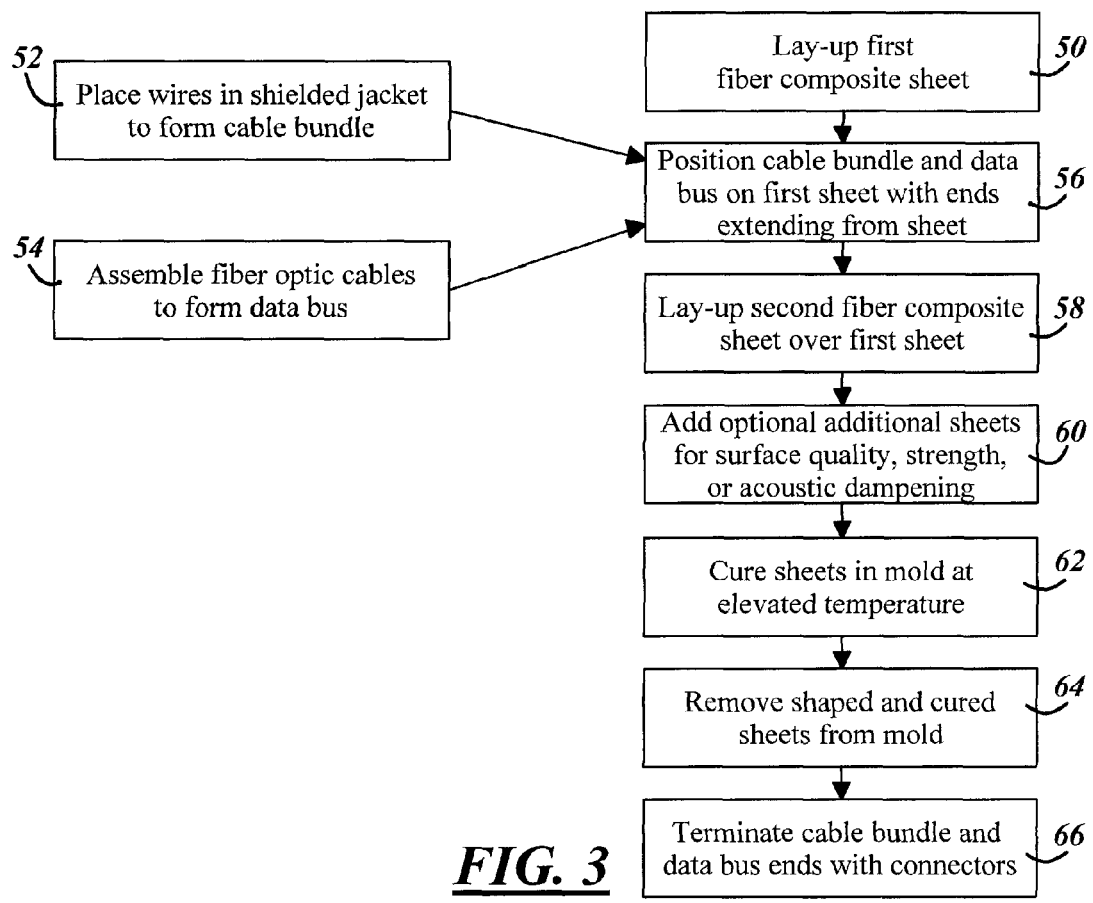
FIG. 3 is a flow diagram of the process of fabricating a composite underbody panel.

FIG. 3 is a flow diagram of the process of fabricating a composite underbody panel for a transportation vehicle. The first step 50 is to lay up a first fiber composite sheet on a tool or form. The tool or form will determine the shape and general contour of the resulting fiber composite underbody panel, but the final form of the panel is developed in the final molding step as described more fully below. The next step 52 is to surround copper wires that will carry current with a shielded jacket to form a cable bundle that will prevent the radiation of EMF from the wires. The copper wires are placed on the sheet with the ends of the wires extending beyond the edges of the sheet. The next step 54 is to assemble one or more fiber optic cables into a bundle to form a fiber optic data bus. Glass fiber optic cables are required in order to withstand the elevated temperatures used in fabricating the underbody panel if thermoset resin is used in the fiber composite sheets. After the data bus has been formed, the next step 56 is to position the copper wire cable bundle from step 52 and the fiber optic data, data bus from step 54 on the first sheet from step 50 with the cable bundle and data bus ends extending beyond the edges of the sheet. A robot may be used to place the copper wires and the fiber optic cables onto the first sheet. Alternatively, the position of the copper wires and the fiber optic cables on the first sheet may be controlled by a template or other guidance device that ensures that the wires and cables are placed on the first sheet in the desired location.

The next step 58 is to lay up a second fiber composite sheet on top of the first sheet produced in step 50. This will embed the current carrying wires and the fiber optic data bus between the two sheets, locking the wires and the data bus in place.

After the second sheet has been laid-up on the first sheet, the next step 60 is to place the two sheets with the embedded current carrying wires and data bus between two mold haves that have the shape and configuration of the underbody panel that is being formed. If thermoset resin used in the composite sheets, heat and pressure are applied to the mold halves to finally cure the resin in the fiber composite sheets and to mold the sheets into the desired end product. If the resin used in the composite sheets is thermoplastic, the sheets will cure to their final state without the external application of heat.

Additional sheets or layers of material may be included on top of or between the first and second sheets to achieve desired levels of surface quality, strength, or acoustic damping in an optional step 62 before the sheets are cured.

After the desired time in the heated mold, the next step 64 is to open the mold and remove the formed composite panel from the mold. The next step 66 is to terminate the ends of the copper wires that extend from the edges of the sheets with electrical connectors, and the ends of the fiber optic data bus that extend from the edges of the sheets with fiber cable connectors. Alternatively, the electrical cables and fiber optic cables are terminated with connectors in steps 52 and 54, respectively, before the cables are positioned on the first sheet in step 56. The electrical cables may also be terminated by electrical connectors 24 that have prongs that are designed to pierce through the fiber composite sheet and the insulation that surrounds the conductors to make electrical contact with the conductors. The fiber cable connectors will later be joined to distributed communication blocks to couple the fiber optic data bus to the instruments and controls of the vehicle.

Having described the invention, various modifications and alterations will occur to those skilled in the art, which modifications and alterations will be within the scope of the invention as defined by the appended claim.

I claim:

1. An underbody panel for a transportation vehicle comprising:
    a first sheet;
    first and second sets of wiring that are positioned in a desired location on the first sheet;
    a sheath surrounding the first set of wiring to prevent the radiation of electromagnetic fields from the wiring;
    the second set of wiring being chosen so that it does not radiate electromagnetic fields,
    fiber optic cable comprising the second set of wiring;
    connectors on the ends of the first and second sets of wiring to couple the first and second sets of wiring to outside devices; and,
    a thermoset or a thermoplastic resin and a high strength fiber or tape material forming the first sheet, whereby the first sheet is cured to form a fiber composite sheet, the fiber composite sheet having one or more features of an underbody panel of a transportation vehicle and comprising an underbody panel of a transportation vehicle.

2. The underbody panel of claim 1 further comprising:
    a second sheet on top of the first sheet, whereby the wiring on the first sheet is between the first and second sheets; and, the first and second sheets are cured to form a fiber composite panel having two layers with the wiring positioned therebetween, the fiber composite panel comprising an underbody panel for a transportation vehicle.

3. The underbody panel of claim 2 further comprising:
a thermoset resin comprising the resin that is used in forming the composite panel.

4. The underbody panel of claim 2 further comprising:
a thermoplastic resin comprising the resin that is used in forming the composite panel.

5. The underbody panel of claim 1 further comprising:
a metal sheath shielding the first set of wiring, whereby the radiation of electromagnetic fields from the first set of wiring into the interior of the transportation vehicle is prevented.

6. The underbody panel of claim 5 wherein the first set of the wiring that is shielded with a metal sheath is at least one conductive wire.

7. The underbody panel of claim 6 wherein the metal sheath is a metal foil wrap or a metal tube that surrounds all of the conductive wires that comprise the first set of wiring.

8. The underbody panel of claim 5 further comprising:
electrical connectors terminating at least some of the first set of wiring, whereby the electrical connectors are located outside of the perimeter of the composite panel.

9. The underbody panel of claim 5 further comprising:
electrical connectors terminating at least some of the first set of wiring, whereby the electrical connectors are located above the surface of composite panel.

10. The underbody panel of claim 9 further comprising:
electrical connectors terminating at least some of the first set of wiring being coupled to a branch line of the wiring that extends above the surface of the composite panel, whereby the electrical connectors are located above the surface of the composite panel.

11. The underbody panel of claim 9 further comprising:
electrical connectors terminating at least some of the first set of wiring coupled to a branch line of the first set of wiring that is below the surface of the second sheet, the electrical connectors having prongs that pierce through the second sheet and the insulation surrounding the wiring to make an electrical connection to the first set of wiring.

12. The underbody panel of claim 5 further comprising:
electrical connectors terminating at least some of the first set of wiring;
at least one of the electrical connectors being imbedded within the composite panel; and,
the at least one imbedded electrical connector having a receptacle portion that is positioned so that it is accessible from the surface of the composite panel.

13. The underbody panel of claim 1 further comprising:
fiber optic connectors terminating at least some of the second set of wiring, whereby the fiber optic connectors are located outside of the perimeter of the composite panel.

14. The underbody panel of claim 1 further comprising:
fiber optic connectors terminating at least some of the second set of wiring, whereby the fiber optic connectors are located above the surface of composite panel.

15. The underbody panel of claim 14 further comprising:
fiber optic connectors terminating at least some of the second set of wiring, the fiber optic connectors being coupled with a branch line of the second set of wiring that extends above the surface of the composite panel.

* * * * *